W. G. ECKHARDT.
MEANS FOR HANDLING EAR CORN.
APPLICATION FILED APR. 13, 1918.
1,334,235.
Patented Mar. 16, 1920.
2 SHEETS—SHEET 2.
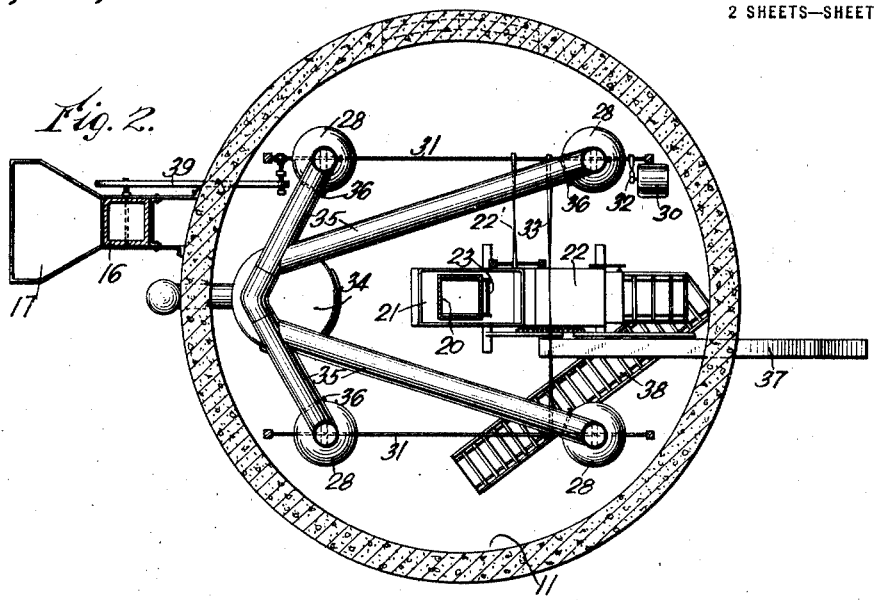
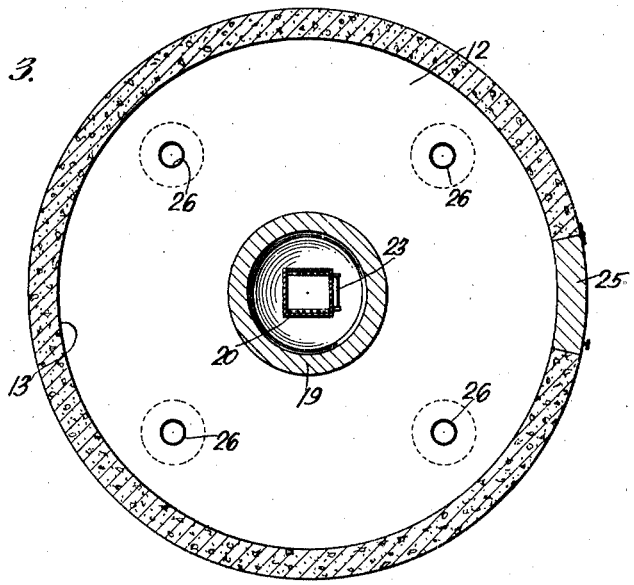
WITNESSES
INVENTOR
W. G. Eckhardt
BY
ATTORNEYS

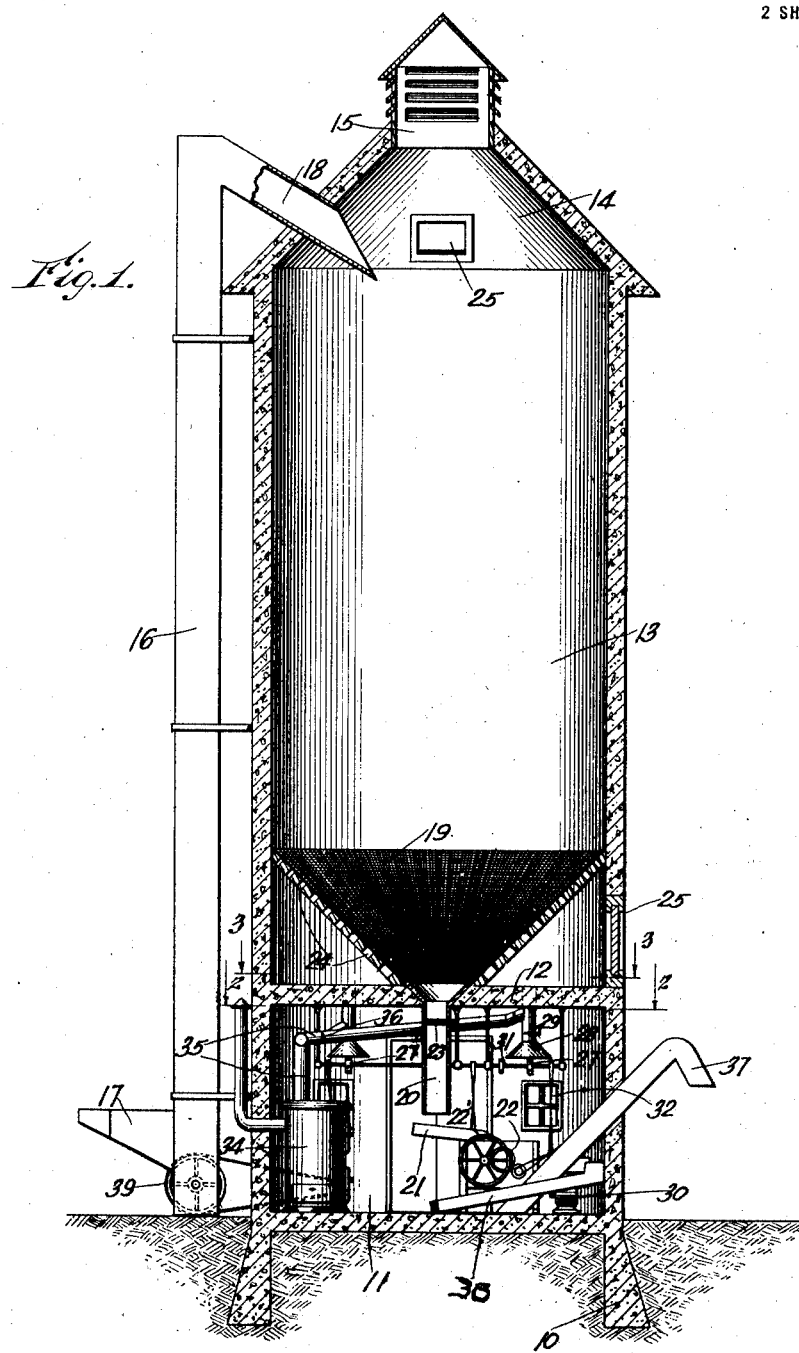

UNITED STATES PATENT OFFICE.

WILLIAM G. ECKHARDT, OF DE KALB, ILLINOIS.

MEANS FOR HANDLING EAR-CORN.

1,334,235.　　　　Specification of Letters Patent.　　Patented Mar. 16, 1920.

Application filed April 18, 1918. Serial No. 228,493.

*To all whom it may concern:*

Be it known that I, WILLIAM G. ECKHARDT, a citizen of the United States, and a resident of De Kalb, in the county of De-Kalb and State of Illinois, have invented a new and Improved Means for Handling Ear-Corn, of which the following is a full, clear, and exact description.

This invention relates to the care, treatment or handling of ear corn, and has particular reference to a means or method whereby a farmer or other operator may treat or handle ear corn fresh from the field or stalk so as to insure the highest or most satisfactory results with respect to insurance against molding, rotting, souring, or loss by other means.

Whereas it is a well known and lamentable fact that many millions of bushels of corn are lost or wasted because of adverse weather or like conditions, by means of my improvement in corn handling systems not only can a main corn crop be expeditiously handled and put upon the market very much earlier than may usually be accomplished, but I also prove that any waste that is incident to the usual causes is unnecessary and inexcusable.

More specifically stated, one of the objects of my invention is to provide a storage receptacle adapted to receive ear corn fresh from the field at any time after it is practically matured and hence irrespective of the quantity of moisture that may be contained in it, means being provided in connection with the receptacle to rapidly and effectively drive the moisture therefrom so rendering the corn fit to be shelled or otherwise put upon the market or used to the highest advantage.

Another object of my invention is to provide a storage receptacle for receiving ear corn while yet moist or imperfectly dried by natural means, said receptacle being so constructed that the ear corn received therein will be in the most advantageous position or condition for the moisture to be driven or forced from it so that the moisture passing from the corn will be carried in such a direction as to not interfere with the periodic deposits of fresh corn into the receptacle from day to day, the means or system being peculiarly adapted for farmers' use whereby the corn deposited or delivered to the receptacle day after day in relatively green or moist state will not interfere with the expeditious and thorough curing of the corn previously delivered into the receptacle.

Another important object realized by this improvement is to enable the farmer to begin his corn harvest from one to two weeks earlier than is usually necessary where the natural curing or drying of the corn in the field is relied upon and whereby the corn husking season may be greatly advanced and accelerated, rendering it possible and expedient for one man to produce and harvest much more corn than heretofore or whereby the field work may be finished long before there is danger of loss due to snow or to provide for a more satisfactory utilization of the ground for winter wheat or the like.

It is to be noted furthermore that in the practice of my invention corn of the largest ear varieties may be satisfactorily grown in localities where the season is comparatively short, whereby the yield per acre may be increased at least five or more bushels, an item of vast importance considering the universal effort made along the lines of production and conservation.

Another object of my invention is to provide a receptacle for corn that is proof against mice, rats, or other vermin, as well as serving as a safeguard against souring, molding, rotting, and also that is practically fireproof.

Another object of my invention is to provide corn handling facilities not only designed to accommodate the moist or wet corn for drying purposes, but having facilities including a heating apparatus for hastening the drying action when necessary and a sheller arranged to receive the previously dried corn from the same receptacle in which the drying operation is taking place with respect to later received corn, the corn cobs from the sheller being delivered either directly into the furnace or the heating apparatus or so close thereto as to be utilized directly for the production of heat utilized in turn either for the drying apparatus or for the production of power to operate the sheller or other mechanism.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical section of one embodiment of my invention; and

Figs. 2 and 3 are horizontal sections on the corresponding lines of Fig. 1.

While the illustrations are more or less diagrammatic in their nature the architectural and mechanical construction may be briefly outlined as comprising the following instrumentalities or their equivalent. The building in its general aspects may be similar to a silo built of reinforced concrete or the like, relatively narrow and high and of any suitable cross sectional form. As indicated there is provided a suitable foundation or base 10 and a basement compartment 11 of suitable capacity to provide room for certain apparatus or machines and work space for the operator. This compartment 11 may be of any convenient height say for example ten or eleven feet and surmounted by a ceiling 12 suitably constructed, reinforced, or supported to constitute the main support for the mass of ear corn adapted to be received into the larger space or receptacle 13 above it. I suggest as an example of a practical size of structure for the average farm of one-hundred-sixty acres in the corn belt, sixteen feet in diameter and with a corn space in the receptacle 13 approximately thirty feet in height. The vertical or side walls of the receptacle 13 as well as the floor or ceiling 12, except as hereafter noted, are approximately air tight, but the receptacle 13 is surmounted with a roof 14 having a cupola 15 of any suitable nature providing for free outflow of moisture laden air.

The fresh or wet ear corn may be delivered into the receptacle 13 by any suitable means and at any desired elevation above the floor 12. I have indicated, however, for this purpose a mechanical elevator 16 into which the corn may be dumped or shoveled adjacent to the ground, as into a hopper 17, the elevator being provided with any movable carrying means of well known construction and adapted to deliver through a chute 18 through the roof 14.

Within the bottom portion of the receptacle 13 I provide a false bottom or what may be termed hereinafter a hopper bottom 19 having several important characteristics in addition obviously to the possession of the requisite strength to support the load imposed upon it. This hopper bottom is so shaped or inclined as to provide for automatic delivery by gravity of the dried corn in any desired direction as for example down through the central outlet 20 directly to the receiving hopper 21 of a power sheller 22 located within the basement compartment 11. The delivery spout 20 may be provided with any suitable cut-off 23 to prevent the delivery of corn therethrough except when desired. Since the hopper bottom is preferably inclined and is adapted to sustain the mass of corn directly thereon the natural tendency is for a greater depth of corn to be supported at the lowest portion than at other portions thereof, hence I provide air spaces or openings 24 through this hopper bottom, said air spaces or holes being materially larger or more commodious adjacent to the lower portion of the hopper bottom than elsewhere. These air holes 24 may be as large as the necessary strength of the structure will permit and in all cases the corn, either ear corn or shelled, will be guarded from passing therethrough by means of a screen of heavy mesh wire or the like covering the upper face of the hopper bottom. Doors or manholes 25 may be provided at any desired places to afford access to the receptacle 13 and any suitable doors or windows may be provided in the basement compartment as will be obvious.

The feature of greatest importance in the practice of my invention is the provision of rapidly moving currents of air, either fresh or heated, upward through the hopper bottom and all of the corn supported thereon, the air laden more or less with moisture taken from the corn passing out the cupola. The structure of the entire device, being somewhat like a chimney and having practically tight sides adapts itself naturally and immediately to the accommodation of if not actually causing the upward draft toward and through the cupola. The floor 12 is preferably provided with a plurality of large openings 26 whereby air passes upward therethrough into the air space between the floor 12 and the hopper bottom 19, thence the air passes freely through the holes 24 and upward through the interstices between the ears of corn. If the corn is not too wet and the climatic conditions are favorable the currents of air passing upward through the floor 12, induced by the chimney like action of the structure, may be sufficient to dry the corn. I prefer, however, to provide air forcing means in the nature of blowers 27 or the like located beneath or within hoods or funnels 28 having direct communication with the air holes 26. The pipes between the hoods 28 and the floor 12 are preferably provided, however, with dampers 29 to cut off communication between these two parts. Any suitable power means may be provided in or adjacent to the basement compartment and for this purpose I indicate at 30 a motor or engine of any suitable or well known type.

31 indicates overhead shafts adapted to be operated by belts or the like from the engine as indicated at 32 and said blowers 27 may be connected directly to said shafts. One shaft, however, may be operated through a belt 33 from the other shaft. Obviously when the blowers are operated the dampers 29 are open so that the air forced upward by the blowers through the floor 12 will fill the air space above the floor 12 and so will pass freely upward through the hopper bottom and the corn thereon, the air passing freest through the largest openings 24 near the bottom of the air space.

34 indicates any suitable type or construction of heater or furnace adapted for any or all of the following purposes. This device is preferably of such a nature as to provide heated air that may be conveyed therefrom through flues 35 directly into the connections between the funnels 28 and the floor openings 26. These flues 35 may be provided with dampers 36 if desired which will normally be closed if unheated air only is being employed. If warm air only from the heater is employed for drying purposes the dampers 29 will be closed while the dampers 36 will be open, or both sets of dampers may be wide open while the blowers are operative to force the largest volumes of air upward through the funnels and so induce more favorable circulation of hot air from and through the flues 35 by a sort of injector action, the flues adjacent to the funnel connections being upwardly directed so as to reduce the likelihood of back draft from one connection to the other. Again, the heater may be of a construction suitable for the generation of steam, if the engine 30 is preferred to be a steam engine as it may be in some instances.

As above indicated I preferably locate the corn sheller 22 within the basement compartment at a convenient place to receive the corn direct from the hopper bottom through the chute 20 and hopper 21. The sheller may be operated by any suitable means, for instance through a belt 22' leading from one of the power shafts 31. The shelled corn will be delivered out through a spout or elevator 37 to wagons, cars, or other receivers while the corn cobs and chaff may be conveyed through the conveyer 38 either directly into the furnace or at any point close thereto, for the purpose not only of disposing of the cobs, but for the economical and satisfactory fuel value of the same in the running, at least in part, of the heating apparatus.

As an indication of convenient means for operating the corn elevator 16 I show power connections 39 with one of the shafts 31 driven from the engine 30. Any convenient means may be provided to throw the elevator into or out of gear with the power devices for the purpose of the apparatus and from the outside of the building.

I claim:

1. In a corn handling apparatus, the combination of a relatively high and narrow corn receptacle having a perforated hopper bottom, the openings through the bottom being largest at the lowest portion thereof, means to prevent the corn from passing through the largest openings in the bottom, means to force a current of drying air upward through said bottom and all of the corn thereover, the corn at the bottom of the receptacle being thus rapidly dried irrespective of the condition of the corn near the top, means to remove the dried portion of the corn from the receptacle while fresh increments of moist corn may be delivered into the top of the receptacle, and means within the lower portion of the structure below said bottom to dispose of the dried product.

2. The herein described continuous corn handling apparatus comprising a relatively high narrow receptacle, means to deliver moist corn into the top thereof, power creating means within the lower portion of the apparatus below the corn to create and force a current of hot drying air upward through the corn, thus causing the lower strata of corn to be quickly dried, the moisture laden air passing upward in the direction of the moist corn, means to discharge the dried corn from and through the bottom of the corn receptacle, means within said lower portion of the apparatus to receive and shell the corn thus delivered, and means to deliver the by-products from the sheller to feed said power creating means for conversion into power and heat, and all self contained within the same apparatus and mutually coöperating with respect to the rapid, efficient, and economical handling of corn.

WILLIAM G. ECKHARDT.